United States Patent [19]

Hyodo et al.

[11] Patent Number: 4,768,561
[45] Date of Patent: Sep. 6, 1988

[54] PROCESS FOR SEALING PIPES

[75] Inventors: Sadahisa Hyodo; Jun Komatsu, both of Hachioji, Japan

[73] Assignee: Three Bond Co., Ltd., Tokyo, Japan

[21] Appl. No.: 22,518

[22] Filed: Mar. 6, 1987

Related U.S. Application Data

[63] Continuation of Ser. No. 676,600, Nov. 30, 1984, abandoned, which is a continuation of Ser. No. 507,710, Jun. 23, 1983, abandoned.

[51] Int. Cl.[4] .............................................. F16L 55/18
[52] U.S. Cl. ....................................... 138/97; 137/15; 427/230
[58] Field of Search ............... 138/89, 97, 98; 137/15; 427/140, 142, 203, 235, 236, 237, 238, 239, 421; 29/402.01, 402.18; 264/36; 118/317, 300

[56] References Cited

U.S. PATENT DOCUMENTS

| | | | |
|---|---|---|---|
| 2,094,692 | 10/1937 | Hitz | 137/15 |
| 2,331,824 | 10/1943 | Buckingham | 427/235 |
| 3,287,148 | 11/1966 | Hilbush | 183/97 X |
| 3,711,309 | 1/1973 | Packo | 138/97 X |
| 4,296,932 | 10/1981 | Grobler | 138/97 X |
| 4,419,163 | 12/1983 | Yamamoto et al. | 427/238 X |

FOREIGN PATENT DOCUMENTS 1322122  7/1973  United Kingdom .................. 137/15

Primary Examiner—James E. Bryant, III
Attorney, Agent, or Firm—Donald D. Mon

[57] ABSTRACT

A process for sealing pipes which comprises feeding a sealant of aerosol type thereinto in the form of foams so as to keep the inside thereof at a pressure of 0.05 kg/cm$^2$ or more, the sealant containing an aqueous resin selected from the group consisting of emulsions and latexes as a main component and being added with a propellant.

The process enables complete prevention or preparing of leakage of fluid in pipes such as gas pipings by a simple operation.

17 Claims, 1 Drawing Sheet

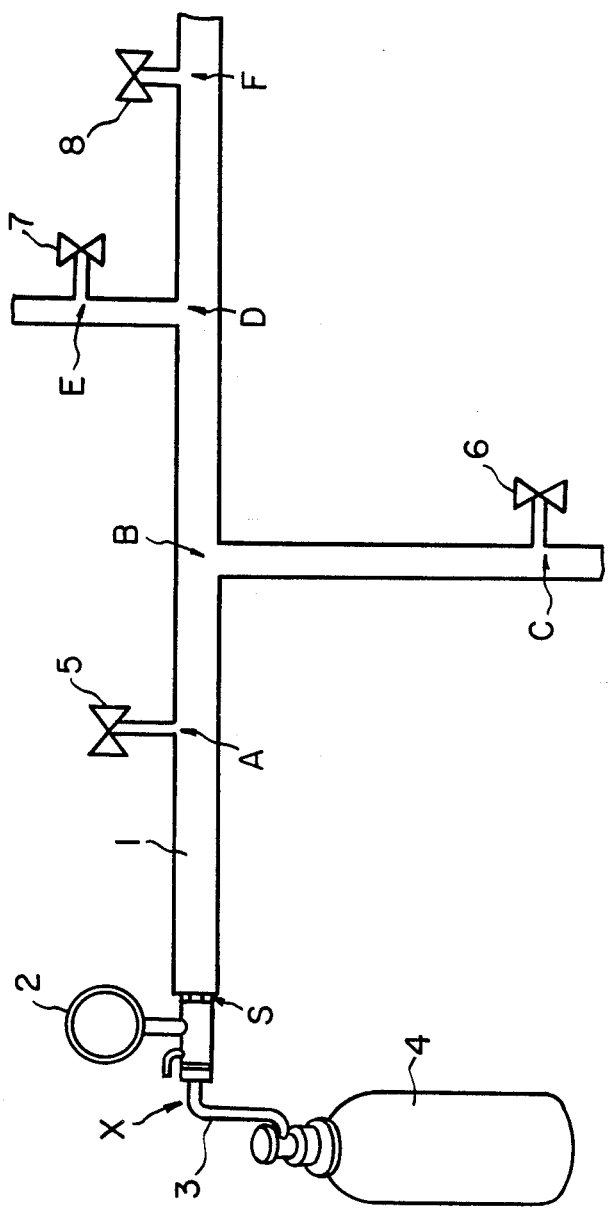

PROCESS FOR SEALING PIPES

This is a continuation of co-pending application Ser. No. 676,600 filed on Nov. 30, 1984, now abandoned, which is a continuation of application Ser. No. 507,710, filed June 23, 1983, now abandoned,

BACKGROUND OF THE INVENTION

This invention relates to a process for sealing pipes which enables complete prevention or repairing of leakage of fluid in pipes such as gas pipings by a simple operation.

In such pipes, many undesirable micro-gaps could be formed around threaded fittings due to failure of threading, insufficient clamping pressure, partial lack of sealant and the like. Fluids in pipes such as gases or liquids often leak out through these gaps, which sometimes cause dongerous accidents. In such cases, it is very difficult to find out where the liquid leaks out because the pipes are usually built in walls, floors or ceilings. Even if one could detect leaking points, it is necessary to tear or break down a part of interior or exterior of buildings, houses and the like, which is very costly and takes a long time. Especially, as multiple dwelling houses and office buildings increase, the leakage of piping is getting to be a serious problem.

There has been proposed many solutions to this problem. According to a typical sealing process of these proposals, a sealant is foamed by means of a foaming machine and then it is fed into a pipe under pressure to seal leakages. However, in such a process, means for foaming the sealant and additionally compressing it into the pipe are necessary and besides, skilled operators and required to carry out the process in safety. Further, its foam density is not stable enough to provide a uniform layer on the surface of the pipe, which causes incomplete sealing.

SUMMARY OF THE INVENTION

Accordingly, it is an object of this invention to provide a method for sealing pipes completely by a simple operation. Another object of this invention is to prevent or repair leakage of fluid in pipes.

According to this invention, these and further objects can be accomplished by providing a method for sealing pipes which comprises feeding a sealant of aerosol type thereinto in the form of foams so as to keep the inside thereof at a pressure of 0.05 kg/cm$^2$ or more thereby the leakage of fluid therefrom being prevented or repaired completely by a simple operation, said sealant containing an aqueous resin selected from the group consisting of emulsions and latexes as a main component and being added to a propellant.

BRIEF DESCRIPTION OF DRAWING

In the accompanying drawing, FIG. 1 shows a schematic diagram of an embodiment of this invention.

DETAILED DESCRIPTION

Referring now more particularly to the drawing in detail, reference numeral 1 indicates a pipe. The pipe 1 is usually provided with a meter union (not shown) at an illustrative position S, which should be removed and fitted up with a connecting means X for feeding a sealant prior to practicing the process of this invention. The connecting means X is provided with a pressure gauge 2. Also, prior to practicing the process, a spray can 4 charged with the sealant is connected to the connecting means X through a nozzle 3, while apparatuses such as boilers, instantaneous water heaters and the like, connected to the pipe 1 directly, should be all demounted from the pipe 1 and house valves or cocks fitted in their place. These cocks, illustratively shown as reference numerals 5,6,7 and 8 in the drawing, are then closed.

On the practice of this invention, the nearest cock 5 from the position S is opened to connect to a sealant recovering tank (not shown) and then the sealant is sprayed from the spraying can 4 into the pipe, thereby the sealant being fed in the form of foams through the nozzle 3 and the connecting means X. When the sealant is sprayed, the feeding pressure is preferably not more than 0.5 kg/cm$^2$ since weakened parts of the pipe due to aging, if any, may be broken by higher pressure.

Spray feeding of the sealant is discontinued when it flows out of the cock 5 which is then closed as soon as possible. At this stage of the process of this invention, the pipe 1 is filled with the foamed sealant in a region defined by the position S and the cock 5 through a point A. The pipe is then filled in a region defined by the point A and the cock 6 through points B and C after the same spraying procedure is repeated as described above while the cock 6 is opened, and the next region defined by the point B and the cock 7 through points D and E is similarly treated while opening the cock 7. Finally, the cock 8 is opened to repeat the same procedure to fill a region defined by the point D and the cock 8 through a point F, and the spray feeding procedure is completed.

After the foamed sealant is fed throughout the pipe 1, additional sealant is sprayed thereinto from the spraying can 4 until the pressure gauge 2 of the connecting means X points to a valve pressure greater than 0.05 kg/cm$^2$ and more preferably in the range of 0.1 to 0.2 kg/cm$^2$. The inside of the pipe 1 should be kept at a desired pressure described above for a period of time sufficient to penetrate the sealant into leaking gaps, e.g. for 10 minutes.

The nozzle 3 is then removed from the connecting means X to take the spraying can 4 away, and a nitrogen or an air cylinder(not shown) is connected thereto in order to discharge the sealant. When the nearest cock from the position S, i.e., the cock 5 in this case, is opened and nitrogen or air is introduced in the pipe 1 from the cylinder, the residual sealant is discharged from the pipe into the sealant recovering tank. The recovered sealant is substantially identical to what has been fed in the region from the position S via the position A up to the cock 5. The cock 5 is closed again when the entire sealant in this region is recovered therethrough. Each sealant fed in other regions in the pipe is successively recovered by repeating the same procedure above, i.e., opening and closing the cocks. Finally, the cock 8 is opened to discharge the sealant in the region form the point D via the point F up to the cock 8, which is then closed when the residual sealant is recovered throughly. The discharging step is completed when the cock 8 is closed. During this step, the pressure in the pipe 1 is preferably kept at a level of 0.2 kg/cm$^2$ as an indication of the pressure gauge 2 while introducing gas such as nitrogen or air thereinto.

Then, keeping all cocks closed, additional gas is fed in the pipe 1 so as to maintain a pressure of 130 mm Hg at the pressure regulator of the gas cylinder. The blowing pressure from each cock is thus measured while keeping the condition stated above. When the pressure level is remarkably low, the same procedure above for discharging the sealant should be repeated because it is believed that the sealant may not be recovered to a desired extent but is still remaining in the pipe.

If the pressure is high enough, each cock is opened and allowed to stand for about 45 minutes. This hardens the sealant permeated into gaps and removes used gas.

The sealant used in this invention contains an aqueous resin selected from the group consisting of emulsions and latexes as a main component and is added to a propellant.

Prefered emulsions include acrylic ester type emulsion such as polymethyl, -ethyl or -butyl acrylate, and polymethyl, -ethyl or -butyl methacrylate; vinyl acetate type emulsion such as polyvinyl acetate; polyethlene emulsion, vinyl acetate-dibutyl maleate copolymer emulsion, and the like.

Prefered latexes include natural and synthetic gum latexes such as Styrene-butadiene rubber and the like.

The aqueous resin selected from the group consisting of emulsions and latexes described above is used as a main component in the sealant of this invention. A stock solution is prepared by mixing the sealant with conventional additives such as freeze-stabilizing agent, anti-corrosive agent, nonionic surface active agent, pH adjusting agent, and the like. The propellant is then added to the stock solution thus prepared.

The freeze-stabilizing agent is employed to improve the shelf life at a lower temperature of, for example, about 0° C. to −5° C. and to prevent freezing upon spraying. Various kinds of alcohols are used for this purpose in amounts of 5 to 10 parts by weight based on 100 parts by weight of the aqueous resin.

The anti-corrosive agent is used to prevent initial corrosion of metals contacted by the sealant. Usually, dicyclohexylamine is used for this purpose in an amount of 2 to 15 parts by weight based on 100 parts by weight of the aqueous resin.

The nonionic surface active agent is used for a purpose to increase the solubility of the propellant in the aqueous resin and to stabilize the foamability or foam density. Further, it is used for an another purpose to remove the propellant effectively from the sealant during aging after application. For the former and the latter purposes, sorbitan monolaurate of polyhydroxy fatty acid esters and polyoxyethylenepolyoxypropyrene polymer are used, respectively, in amounts of 0.1 to 0.5 parts by weight based on 100 parts by weight.

The pH adjusting agent is used to improve the shelf life of the aqueous resin. Aqueous ammonia is used for this purpose in an amount of 0.1 to 0.2 parts by weight based on 100 parts by weight of the aqueous resin.

The propellant is used to spray and feed the sealant into the pipe and to stabilize the foamability. Fluorinated hydrocarbon(Feron gas), LPG and the like are generally used, but a composition of $CCl_2F_2$(Freon 12) and $CClF_2$-$CClF_2$(Freon 114) is preferable. These two components are combined with each other at such a ratio that they generate enough pressure to spray the sealant into the pipe in the form of foams. Preferred ratio is Freon 12: Freon 114=70 to 80:20 to 30(wt. %).

Illustrative composition of the present sealant is as follows (unless otherwise noted, amount of each component is all based on part by weight):

STOCK SOLUTION

PRIMAL N-580S ®: 100
(Polybutyl acrylate; Products of Rohm and Haas Co. in U.S.A.),
NONION LP-20R ®: 0.15
(Sorbitan monolaurate; Products of Nihon Yushi Co.,Ltd.),
RUSHIN V-4: 2
(Anti-corrosive agent produced by Kyoeisha Yushikagaku Kogyo Co., Ltd.)
Aqueous ammonia: 0.2
(pH adjusting agent),
PLURONIC L-61 ®: 0.12
(Polyoxethlene-Polyoxypropylene polymer; nonionic surface active agent produced by Asahi Denka Kogyo Co., Ltd.),
SOLMIX H-11 ®: 8
(Freeze-stabilizing agent produced by Nihon Kaseihin Co., Ltd.)
Ion-exchanging water: 60

PROPELLANT

Freon 12/Freon 114=80/20 (wt. %),

SEALANT

The sealant composition was prepared by mixing 7.7% by volume of the propellant with 92.3% by volume of the stock solution.

The present sealant thus prepared shows the following advantages:

(a) It is not necessary to use a foaming machine since the sealant is foamed chemically by means of the propellant;

(b) Conventional means for compressing the sealant is not required since the present sealant is of an aerosol type and thus it is easily sprayed into the pipe;

(c) The absence of such means for foaming and compressing saves man power, especially the necessity of skilled operators;

(d) The foam density is far more stable than that of conventional foams because of fine and uniform foams which are formed by the propellant dissolved in the aqueous resin.

As described above in detail, the process for sealing pipes for this invention provides complete prevention or repairing of leakage by a simple operation and is extremely valuable for practical use.

What is claimed is:

1. A resealing process for repairing pipes comprising:
closing off a section of a pipe by attaching and closing valves at several locations along said section of pipe to be sealed;
pressurizing a spray can with a charge of sealant;
connecting said pressurized spray can charged with a sealant to one end of said closed off section of said pipe;
providing at least one of said valves in said section of pipe to be sealed;
opening at least one of said valves ;
discharging said sealant from said pressurized spray can into said section of pipe, said sealant being at a pressure up to a pressure of approximately not more that 0.5 kg/cm$^2$ and not less than 0.05 kg/cm$^2$;
closing at least one of said values when said sealant begins to flow out of at least one of said valves;
disconnecting said spray can from said closed off section of pipe;
attaching a pressurized cylinder of gas to said closed off section of pipe;

applying said gas from said pressurized cylinder while successively opening and closing said valves to surge and recover excess sealant;

closing all of said valves after excess sealant has been recovered;

pressurizing said closed off section of said pipe to a predetermined pressure;

maintaining said closed off section of pipe at said predetermined pressure for a minimum period of time;

removing said pressurized cylinder of gas;

opening all of said valves for a predetermined minimum period of time to release all of said gas under pressure and allow said sealant to harden;

2. The process according to claim 1 in which said section of pipe has a plurality of valves and includes the steps of sequentially opening and closing said valves beginning with the valve nearest to said spray can to provide sealant to said section of pipe in stages.

3. The process according to claim 2 including closing all valves; discharging said sealant from said spray can up to a pressure of from 0.1 to approximately about 0.2 kg/cm$^2$; maintaining said pressure for a predetermined period.

4. The process according to claim 3 including maintaining said pressure for a period of approximately about 10 minutes or more.

5. The process according to claim 4 including;
applying a gas pressure to said section of pipe in excess of 0.05 kg/cm$^2$;
successively opening said valves to remove excess sealant.

6. The process according to claim 5 in which said pressure applied to said section of pipe is air pressure.

7. The process according to claim 5 in which said pressure applied to said section of pipe is nitrogen gas pressure.

8. The process according to claim 5 including closing all valves; applying a pressure of 130 mm Hg to said section of pipe for a predetermined period.

9. The process according to claim 8 including opening each of said valves while maintaining said pressure to remove excess gas and allow said sealant to harden.

10. The process according to claim 9 in which said sealant is comprised of an emulsion combined with a propellant.

11. The process according to claim 9 in which said sealant is comprised of a latex combined with a propellant.

12. The process according to claim 10 in which said emulsion is selected from the group consisting of polymethyl acrylate, polyethyl acrylate, polybutyl acrylate, polymethyl methacrylate, polyethyl methacrylate, polybutyl acrylate, polyvinyl acetate, and vinyl acetate-dibutyl maleate copolymer.

13. The process according to claim 11 in which said latex is selected from the group consisting of natural rubber, styrene butadiene rubber, butadiene rubber, and isoprorene rubber.

14. The process according to claim 12 in which said propellant is selected from the group consisting of freon gas, $CCL_2F_2$ and $CCL\ F_2\text{-}CCLF_2$.

15. The process according to claim 13 in which said propellant is selected from the group consisting of freon gas, $CCL_2F_2$ and $CCL\ F_2\text{-}CCLF_2$.

16. The process according to claim 14 in which said propellant is a combination of said group of propellants in a ratio of $CCL_2F_2$ to $CCL\ F_2CCLF_2$ is in the range of 70/30% by weight to 80/20% by weight.

17. The process according to claim 15 in which said propellant is a combination of said group of propellants in a ratio of $CCL_2F_2$ to $CCL\ F_2\text{-}CCLF_2$ is in the range of 70/30% by weight to 80/20% by weight.

* * * * *